United States Patent
Graham

(10) Patent No.: US 7,819,567 B2
(45) Date of Patent: Oct. 26, 2010

(54) LIGHTING DEVICE HAVING LED'S IN A TRANSPARENT BODY

(76) Inventor: Morton Graham, 1 Whins Crest, Lostock, Bolton (GB) BL6 4NH ( * ) Notice: Subject to any disclaimer, the term of this patent is extended or adjusted under 35 U.S.C. 154(b) by 0 days.

(21) Appl. No.: 12/482,853

(22) Filed: Jun. 11, 2009

(65) Prior Publication Data

US 2009/0244902 A1   Oct. 1, 2009

Related U.S. Application Data

(63) Continuation of application No. PCT/GB2007/004882, filed on Dec. 19, 2007.

(30) Foreign Application Priority Data

Dec. 22, 2006   (GB) ................... 0625761.2

(51) Int. Cl.
   *F21V 7/04* (2006.01)
(52) U.S. Cl. ................... 362/555; 362/240; 362/249.02
(58) Field of Classification Search ................ 362/551, 362/555, 225, 240, 249.02–249.06, 294
   See application file for complete search history.

(56) References Cited

U.S. PATENT DOCUMENTS

| 5,982,969 | A | * | 11/1999 | Sugiyama et al. | ........... 385/123 |
| 6,244,726 | B1 | * | 6/2001 | Fan Wong | ................... 362/240 |
| 6,404,131 | B1 | * | 6/2002 | Kawano et al. | ............... 315/82 |
| 7,396,142 | B2 | * | 7/2008 | Laizure et al. | .............. 362/240 |

FOREIGN PATENT DOCUMENTS

| DE | 10349788 A1 | 5/2005 |
| GB | 2219884 A | 12/1989 |
| WO | 02/065016 A | 8/2002 |

* cited by examiner

*Primary Examiner*—Gunyoung T Lee
(74) *Attorney, Agent, or Firm*—Gauthier & Connors LLP

(57) ABSTRACT

A lighting device comprising a transparent acrylic or glass rod (10) with a series of bores (11) drilled in parallel through a part of the rod and spaced apart along its length, each bore (11) containing a pair of LEDs (12) such that the light emitted therefrom is diffused along the length of the rod, and a reflective strip (17) disposed along the rod to reflect a beam of light outwardly from the rod (10) in a direction parallel to the axes of the bores (11) to provide illumination for display purposes or ambient light.

12 Claims, 3 Drawing Sheets

LIGHTING DEVICE HAVING LED'S IN A TRANSPARENT BODY

PRIORITY INFORMATION

This application is a continuation of International Application No. PCT/GB2007/004882 filed on Dec. 19, 2007 which claims priority to Great Britain Patent Application No. 0625761.2 filed on Dec. 22, 2006, all of which are incorporated by reference in their entirety herein.

BACKGROUND OF THE INVENTION

This invention concerns a lighting device which may be used to provide ambient light or for display purposes and including a light source, preferably light emitting diodes (LEDs) to produce an overall light output from the device equivalent to, if not in excess of, the light output expected from a fluorescent tube, but with considerably less electrical energy consumption and with a much more compact device overall. The invention is predicated upon the principle of injecting light into a transparent body and causing the light to be totally internally reflected therein and then diffusely reflected outwards therefrom using a diffusely reflective medium.

SUMMARY OF THE INVENTION

According to the present invention a lighting device comprising a translucent or transparent body, of a material which will sustain total internal reflection of light, at least one electrically powered light source disposed within the body, such that light emitted therefrom is substantially totally internally reflected therein and a reflector to reflect light from the body.

Preferably, the body is of cylindrical form with at least one bore extending into the body in a generally radial or transverse direction, the light source being located in the bore such that light emitted therefrom is directed into the body generally normal to the axis of the bore.

The light emitted from the or each light source may be directed parallel to a central longitudinal axis of the body and for this purpose the body may be a solid transparent acrylic or glass rod.

The reflector may be a diffusely reflective strip (such as a white tape or white co-extrusion) extending along the body at or near the surface thereof and may be positioned such as to diffusely reflect light from out of the body of the rod in a direction approximately parallel to the or each bore, ie, generally normal to the rod axis. In this manner, the illumination from the rod device appears akin to that of a conventional fluorescent type lamp.

The or each light source may be a light emitting diode (LED); the radiant output of the LED may lie in any region of the electromagnetic spectrum, ie, ultraviolet, visible and infrared as appropriate to the application.

Preferably, a row of such bores may be provided spaced along the length of the rod and each may house a pair of LEDs disposed back to back.

Alternatively, the light source may be embedded wholly within the material of the body as opposed to being disposed within a bore.

The reflector may be a part of a lamp housing located close to the body.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
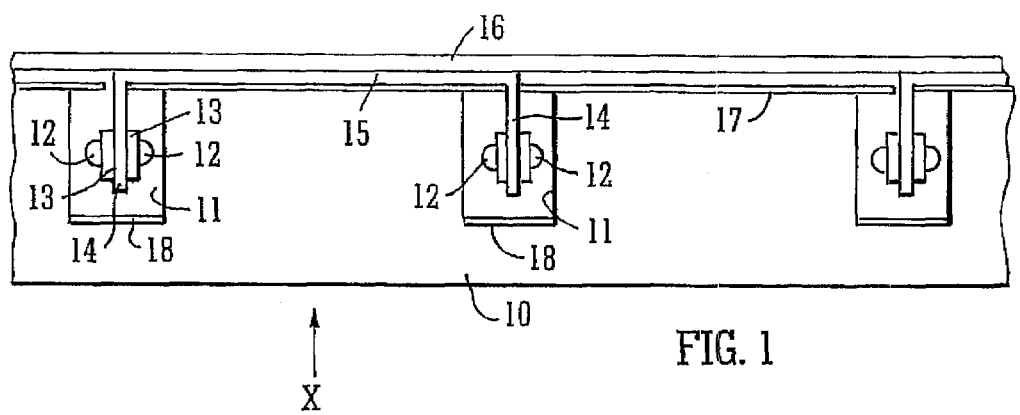
FIG. 1 is a side view of a lighting device made in accordance with a first embodiment of the invention.
Figure 2:
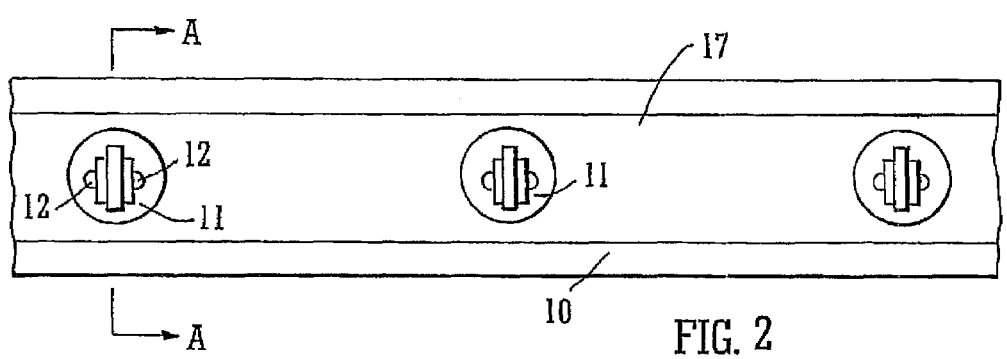
FIG. 2 is a view taken in the direction of an arrow X in FIG. 1.
Figure 3:
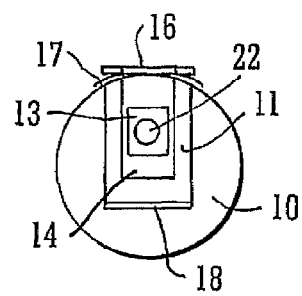
FIG. 3 is a cross-section taken on line A-A of FIG. 2.

Referring now to FIGS. 1 to 3 of the drawings, the lighting device comprises a clear acrylic or glass rod 10 which, for the purpose of this description, may be some 660 mm in length and 30 mm in diameter. Disposed at spaced locations along the rod 10 is a series of bores 11 which are drilled in parallel to a depth of 20 mm to 60 mm centres. The first of this series of bores at each end of the rod 10 is located 30 mm from its adjacent end.

Disposed within each bore is a pair of LEDs 12 each mounted on its supply circuit board 13. The boards 13 and the LEDs 12 are mounted back to back on a bracket 14 which extends between each pair of adjacent bores 11. Each bracket 14 has a web 15 attached to a mounting strip 16 extending along the entire device. The brackets 14, web 15 and mounting strips 16 are of metallic material to serve as a heat sink to absorb the heat generated by the LEDs 12. To some extent the air space within each bore 11 also absorbs heat and allows it to escape by convection at its upper open end. Optionally, the bore may be completely filled with an index matching liquid or resin to aid thermal conduction away from each LED and enhance the light coupling into the internal rod structure.

Extending along the entire device in an upper region of the circumferential surface of the rod 10 is a white diffusely reflective strip 17 which can be viewed also in FIG. 3, and the closed end of each bore 11 also has a reflective coating 18. The width of the diffusely reflecting strip can be selected to determine the width (ie. projected angle) of the illuminating beam exiting the rod.

End caps (not shown) may be provided on the opposed ends of the rod 10 and also have white reflective surfaces internally.

The light emitted by the LEDs 12 is caused to be diffused by substantially total internal reflection down the length of the rod and, but for the reflectors 17, 18, would be virtually invisible. However, the reflective surfaces cause a beam of the diffused light to exit the road diametrically opposite the reflective strip 17. The width of the beam is determined by the width of the reflector which can, in this example, be some 15 mm to 20 mm. The reflective strip 17 may be integrally formed with the rod 10 if of an extruded form or it can be bonded to the circumferential surface of the rod. As far as possible it should also extend across the open tops of the bores 11 although this may be impractical in view of the desire to allow heat to escape from the bores.

The brackets 14 may be bonded in the underside of the heat sink strip 16 or otherwise attached, such as by welding or fasteners.

In the example shown, twenty two such LEDs 12 are provided along the device and each has a lens area of about 20 sq mm. The total light source area is therefore in the region of 440 sq mm. If the rod is 6 mm long and the reflector is 2 mm wide, giving an area of 13,200 sq mm, this allows the exitance of beam of light emerging from the rod to be reduced by a factor of around 30 in this instance, with the same amount of radiant light power being emitted, but from a larger surface area, such that it is more acceptable to the human eye from the potential radiation hazard perspective. Thus, high strength LEDs can be used in commercially acceptable ambient lighting without the need for additional diffusers on the outside of the lamp. Such diffusers would tend to block something like 50% of the emitted light. An external diffuser may be incorporated into a luminaire design if desired, for eg, cosmetic purposes.

Each LED may consume between 1 and 3 watts of electrical power, for example, and they are controllable by varying either the current or voltage input to the lamp. For example, at 3 watts electrical power consumption each, the LEDs in the device described will produce something in excess of 3,200 lumens assuming a luminous efficiency of around 50 lumens per watt, which is at a level equivalent to that produced by high-quality fluorescent lamps.

Another advantage of using LEDs is that they reach full light output almost instantaneously, unlike fluorescent tubes which need to warm up before providing the required light output. Also, being controllable as to their current or voltage input, LEDs can be easily dimmed, unlike fluorescent lighting. Furthermore, LEDs are efficient at low ambient temperatures increasing their effectiveness for use in refrigeration related applications.

If necessary, the webs 15 and brackets 14 may be slidably mounted on the strip 16 thus to accommodate any expansion and contraction as a result of the heat output from the LEDs.

Figure 4:
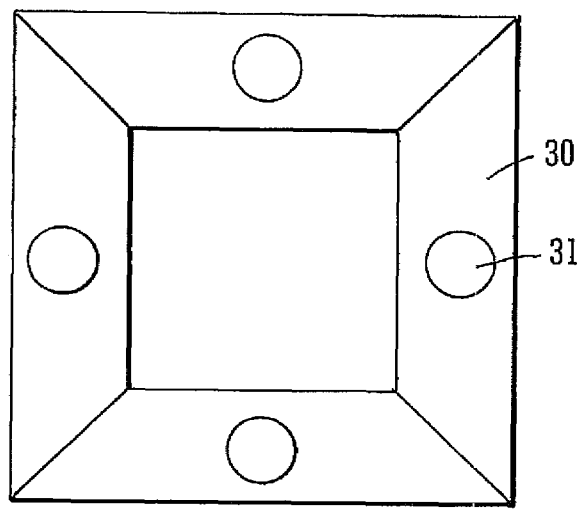
FIG. 4 is a schematic plan view of the lighting device arranged into a rectangular configuration.
Figure 5:
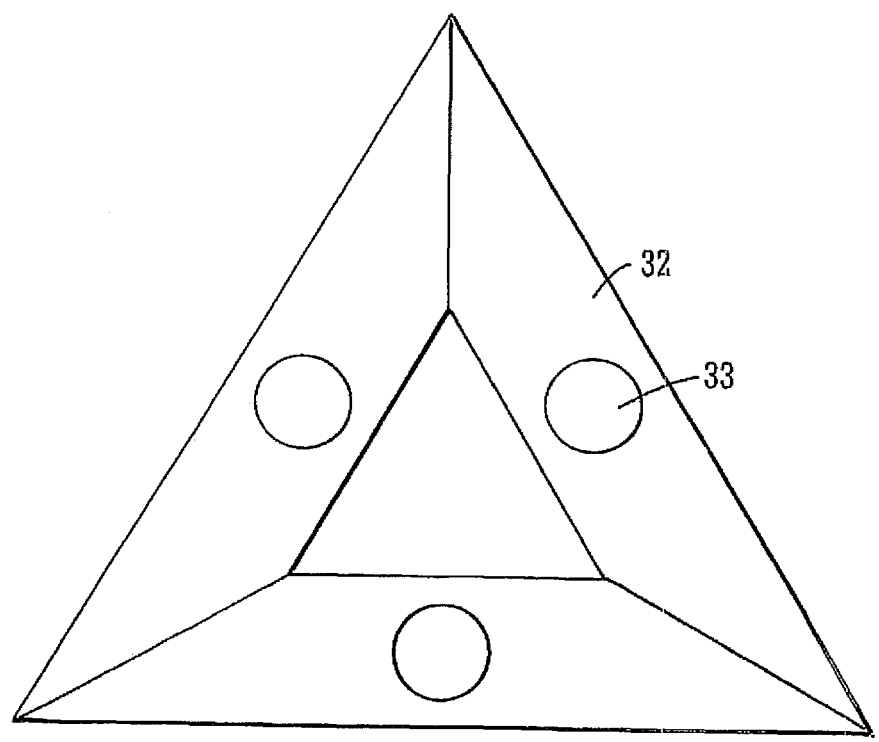
FIG. 5 is a schematic plan view of the lighting device arranged into a triangular configuration.
Figure 6:
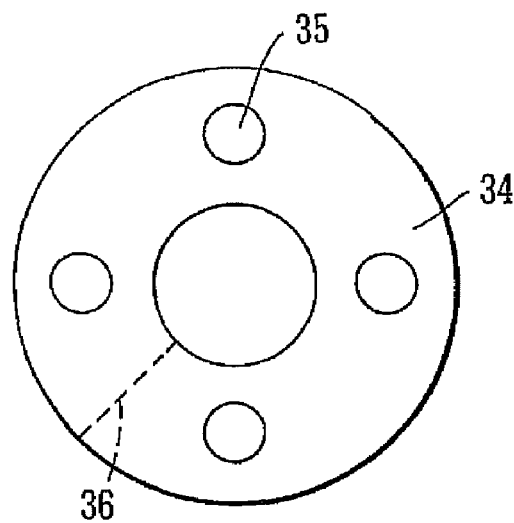
FIG. 6 is a schematic plan view of the lighting device arranged into a circular configuration.

Referring now to FIGS. 4 to 6, instead of a straight rod other configurations may be adopted. In FIG. 4 a lamp is made up of four straight portions 30 mitred and joined to form a rectangular configuration. In this example each portion 30 contains a single LED assembly similar to that illustrated by reference numerals 11, 12, 14 and 18 in FIG. 1. Each portion 30 may have additional such assemblies if required.

In FIG. 5 three straight portions 32 are joined to form an equilateral triangle, again with LED assemblies 33.

In FIG. 6 a single rod-like body 34 is of annular form and includes an array of LED assemblies 35. It may be cast in this form or bent and joined as at 36.

In all of the embodiments illustrated, the cross-section of the bodies 10, 30, 32 and 34 is preferably circular thus acting as a lens for the light output but may be elliptical or of rectangular or other cross-sectional shape. This provides a considerable advantage over incandescent and fluorescent lamps where the formation of such shapes will be considerably more complex and costly in manufacture.

The rod 10 and the different configurations illustrated in FIGS. 4 to 6 may be formed by casting of the material or, as in FIGS. 1 to 3, by extrusion. In FIGS. 4 and 5 extruded rod may be cut into appropriate lengths and joined using a liquid acrylic material to form, in effect, molecular bonding, thus eliminating or minimising light reflection at the joints for optical continuity around the structure.

Figure 7:
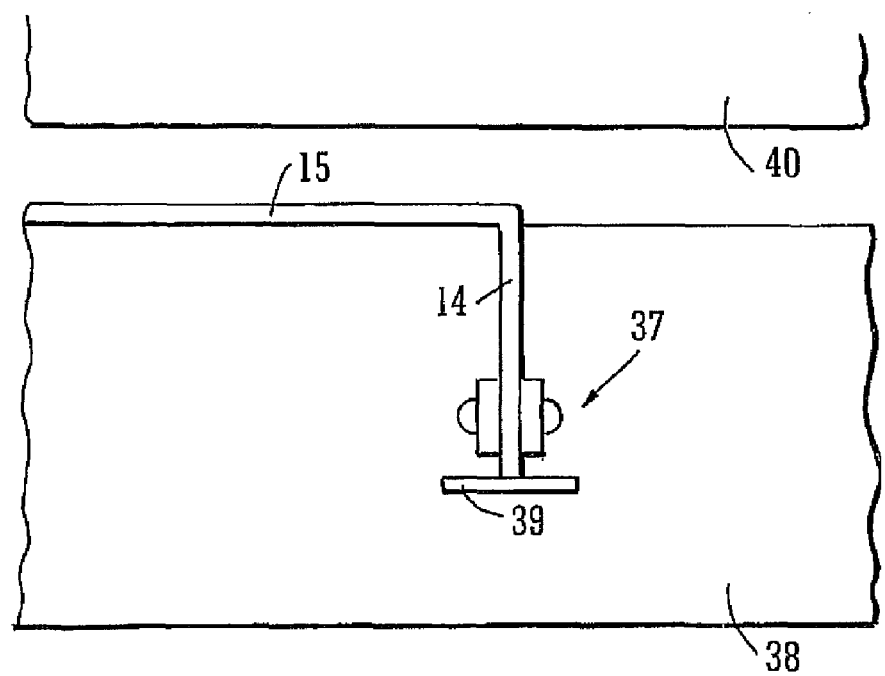
FIG. 7 is a side view of a lighting device in accordance with a second embodiment.

Referring now to FIG. 7, while the LED assemblies in the examples illustrated and described above are located in bores extending transversely into rod-like structures, alternatively the structures may be cast with one or more LED assemblies 37 wholly embedded within the material of the body 38, provided that adequate heat dissipation is provided, for example through the brackets 14, 15. In the case where the LED assemblies are embedded within the material it is preferable that a reflective or at least opaque plate 39 is provided beneath each assembly so that the LEDs are not directly visible from a direction opposed to that in which the light is emitted, ie, that they shall not be visible in the direction of arrow X in FIG. 1

The lighting structures described herein, for convenience, are produced in a rod-like form but may instead be formed as a solid body of any shape with one or more LEDs disposed within it and a reflector to cause the light to exit the body in the required direction. A body having a curved or circular cross-section provides a lensing effect, thus magnifying the beam of light produced.

The reflector may be separate from the body as shown at 40 in FIG. 7, and provided, for example, by a part of a lamp housing located close to the body.

It will be understood that any photons within the body which strike the wall of the body at an angle of less than 40° will be reflected back into the body and cannot escape until reflected out by the reflector 17.

It is not intended to limit the invention to the above example only, many variations, such as might readily occur to one skilled in the art, being possible without departing from the scope of the invention as defined in the appended claims.

One commercial application of such a lighting device is in large cabinet display freezers or refrigerators as used in supermarkets where, conventionally, 1.5 meter fluorescent tubes are placed vertically at spaced intervals, whereas a pair of such tubes may be replaced by a single device according to the invention placed, for example, horizontally over a door or the like. The device is much safer than a fluorescent tube since it is of solid construction and thus is not readily broken by goods being placed into or removed from such display cabinets.

What is now claimed:

1. A lighting device comprising:
   a solid transparent rod of cylindrical form having a central longitudinal axis and being of a material that sustains total internal reflection of light,
   two or more radial bores provided and spaced apart along the length of the rod, an electrically powered light source disposed within the bores, the light source comprising a pair of LEDs disposed back to back whereby light emitted from each LED is directed parallel to the central longitudinal axis of the body and generally normal to the axis of the bore, and such that light is substantially totally internally reflected in the rod, and
   a reflector to reflect light from the rod, wherein the reflector is a diffusely reflective strip extending along the rod at or near the surface thereof.

2. The lighting device according to claim 1, wherein the rod is of an acrylic material.

3. The lighting device according to claim 1, wherein each bore is of circular cross-section and formed by radial drilling of the rod.

4. The lighting device according to claim 1, wherein the reflector is a strip extending along the rod and having a width greater than the diameter of each bore.

5. The lighting device according to claim 1, wherein each LED is mounted on a circuit board which circuit board is mounted on a metallic heat sink.

6. The lighting device according to claim 1, wherein each bore extends only part way through the rod, the closed end of each bore having a reflective surface.

7. The lighting device according to claim 1, wherein each bore is filled with an index matching liquid or resin to aid thermal conduction away from the light source and enhance light coupling into the rod.

8. The lighting device according to claim 1, wherein the rod is formed by casting with each LED embedded within the material of the rod.

9. The lighting device according to claim 1, wherein the rod is formed from lengths joined end to end, each length containing one or more light sources.

10. The lighting device according to claim 1, wherein the rod is formed from a length of solid transparent rod arranged to form an annulus, the ends of the rod being bonded together.

11. The lighting device according to claims 1, wherein the rod is formed or cast in annular configuration.

12. The lighting device according to claim 1, wherein the reflector is separate from the rod.

\* \* \* \* \*